(12) United States Patent
Kuzdal et al.

(10) Patent No.: US 11,780,381 B2
(45) Date of Patent: Oct. 10, 2023

(54) MIRROR REPLACEMENT SYSTEM WITH CAMERA ANTI-SOILING FEATURE

(71) Applicant: Stoneridge Electronics AB, Solna (SE)

(72) Inventors: John Kuzdal, Ann Arbor, MI (US); Malik Franklin, Ann Arbor, MI (US); Bilal Alkahalah, Ann Arbor, MI (US); Floyd Morris, Ypsilanti, MI (US); Antonio Ciarelli, Milford, MI (US)

(73) Assignee: STONERIDGE ELECTRONICS AB, Solna (SE)

( * ) Notice: Subject to any disclaimer, the term of this patent is extended or adjusted under 35 U.S.C. 154(b) by 173 days.

(21) Appl. No.: 17/626,410

(22) PCT Filed: May 14, 2020

(86) PCT No.: PCT/US2020/032878
§ 371 (c)(1),
(2) Date: Jan. 11, 2022

(87) PCT Pub. No.: WO2020/232241
PCT Pub. Date: Nov. 19, 2020

(65) Prior Publication Data
US 2022/0250556 A1    Aug. 11, 2022

Related U.S. Application Data

(60) Provisional application No. 62/847,601, filed on May 14, 2019.

(51) Int. Cl.
*B60R 11/04* (2006.01)
*B60R 1/22* (2022.01)
(Continued)

(52) U.S. Cl.
CPC .............. *B60R 11/04* (2013.01); *B60R 1/22* (2022.01); *G02B 27/0006* (2013.01); *H04N 7/18* (2013.01); *B60R 2011/004* (2013.01)

(58) Field of Classification Search
None
See application file for complete search history.

(56) References Cited

U.S. PATENT DOCUMENTS 8,208,023 B2   6/2012   Asai
9,409,529 B2   8/2016   Dziurda et al.
(Continued)

FOREIGN PATENT DOCUMENTS

CN   106314281 A   1/2017
CN   108859976 A   11/2018
(Continued)

OTHER PUBLICATIONS

International Search Report and Written Opinion for International Application No. PCT/US2020/032878 dated Jul. 7, 2002.
(Continued)

*Primary Examiner* — Rebecca A Volentine
(74) *Attorney, Agent, or Firm* — Carlson, Gaskey & Olds, P.C.

(57) ABSTRACT

A camera arm (16) for a vehicle mirror replacement system includes a housing (22) having an exterior surface (38). The camera arm (16) also includes a camera assembly (32) that is mounted to the housing (22), the camera assembly (32) having a lens (34). The camera arm (16) further includes a peripheral wall (36) extending from the exterior surface (38) and at least partially circumscribing the camera assembly (32). The camera arm (16) also includes a discontinuity (41) provided on the peripheral wall (36), the discontinuity (41) is configured to create a high pressure region (PH) near the lens (34) that encourages debris (52) to migrate away from the lens (34) in response to a fluid flow over the peripheral wall (36).

15 Claims, 4 Drawing Sheets

(51) Int. Cl.
*G02B 27/00* (2006.01)
*H04N 7/18* (2006.01)
*B60R 11/00* (2006.01)

(56) References Cited

U.S. PATENT DOCUMENTS

| | | |
|---|---|---|
| 10,442,368 B2 | 10/2019 | Okabe et al. |
| 11,052,833 B2 | 7/2021 | Oba |
| 11,115,571 B2 | 9/2021 | Yoshii |
| 11,279,325 B2 | 3/2022 | Sykula et al. |
| 2011/0267466 A1 | 11/2011 | Brester |
| 2015/0195435 A1 | 7/2015 | Oshida et al. |
| 2017/0028918 A1 | 2/2017 | Sato et al. |
| 2017/0182944 A1 | 6/2017 | Achenbach et al. |
| 2018/0009394 A1* | 1/2018 | Okabe .................. B60R 1/00 |
| 2019/0068845 A1 | 2/2019 | Krishnan et al. |
| 2020/0076996 A1* | 3/2020 | Yoshii .................. H04N 23/57 |

FOREIGN PATENT DOCUMENTS

| | | |
|---|---|---|
| DE | 102018120334 A1 | 2/2019 |
| EP | 3374796 B1 | 7/2019 |
| WO | 2015/141457 A1 | 9/2015 |

OTHER PUBLICATIONS

International Preliminary Report on Patentability for International Application No. PCT/US2020/032878 dated Nov. 25, 2021.

\* cited by examiner

MIRROR REPLACEMENT SYSTEM WITH CAMERA ANTI-SOILING FEATURE

CROSS-REFERENCE TO RELATED APPLICATIONS

This application claims priority to U.S. Provisional Application No. 62/847,601 which was filed on May 14, 2019, and is incorporated herein by reference.

BACKGROUND

This disclosure relates to a mirror replacement system utilizing a camera and displays within the vehicle.

A mirror replacement system utilizes cameras arranged on the exterior of the vehicle to provide views to the driver that are traditionally supplied by side-view mirrors. In one type of configuration, a display is provided within the vehicle cab near each A-pillar. Each display provides a rear-facing view for that side of the vehicle. In commercial trucking applications, a camera arm is mounted on left and right sides of the vehicle cab to provide at least Class II and Class IV views.

At least one camera assembly is provided in each of the camera arms for supplying the image to the display. The camera assemblies and their associated lenses are aft facing and relatively shielded from weather and debris. Nonetheless, a camera lens can accumulate smudges or dirt during vehicle operation, which at least partially obstructs or comprises the views provided to the displays.

SUMMARY OF THE INVENTION

In one exemplary embodiment, a camera arm for a vehicle mirror replacement system includes, among other things, a housing that has an exterior surface. The camera arm also includes a camera assembly that is mounted to the housing, the camera assembly has a lens. The camera arm further includes a peripheral wall that extends from the exterior surface and at least partially circumscribes the camera assembly. The camera arm further includes a discontinuity that is provided on the peripheral wall, the discontinuity is configured to create a high pressure region near the lens that encourages debris to migrate away from the lens in response to a fluid flow over the peripheral wall.

In a further embodiment of any of the above, the camera is configured to provide a field of view that includes at least one of Class II and Class IV views to a display that is in communication with the camera and configured to display the field of view.

In a further embodiment of any of the above, the housing includes a base that is configured to be secured to a vehicle. An arm is configured to articulate relative to the base, the arm provides the exterior surface and the peripheral wall.

In a further embodiment of any of the above, the peripheral wall includes a terminal surface that provides an opening, and the camera assembly is arranged in the opening. The lens is recessed relative to the terminal surface.

In a further embodiment of any of the above, the discontinuity is provided by a lip that is arranged circumferentially about the peripheral wall near the terminal surface.

In a further embodiment of any of the above, the lip is arranged at the terminal surface.

In a further embodiment of any of the above, the peripheral wall includes a groove. The groove is adjacent to and provides the lip.

In a further embodiment of any of the above, the peripheral wall extends along a camera centerline in a first direction. The groove has a width in the first direction. The peripheral wall has a diameter in a second direction that is normal to the first direction, and the width is at least 3% of the diameter.

In a further embodiment of any of the above, the peripheral wall extends along a camera centerline in a first direction. The peripheral wall has a diameter in a second direction normal to the first direction. The groove has a depth in the second direction, and the depth is at least 5% of the diameter.

In a further embodiment of any of the above, the lip begins within about 1 mm of the terminal surface.

In a further embodiment of any of the above, the housing encloses electronics that provide at least one of night vision and video processing.

In another exemplary embodiment, a camera mirror system for a vehicle includes, among other things, a camera that has a field of view. The system also includes a display that is in communication with the camera that is configured to depict the field of view. The system further includes a housing that has an exterior surface. The system further includes a camera assembly that is mounted to the housing. The camera assembly has a lens. The system further includes a peripheral wall that extends from the exterior surface and at least partially circumscribes the camera assembly. The system further includes a discontinuity that is provided on the peripheral wall. The discontinuity is configured to create a high pressure region near the lens that encourages debris to migrate away from the lens in response to a fluid flow over the peripheral wall. The system further includes a controller that includes a video processor that is configured to provide a video signal to the display.

In a further embodiment of any of the above, the camera is configured to provide a field of view that includes at least one of Class II and Class IV views to a display that is in communication with the camera and configured to display the field of view. The exterior surface is in the immediate area that surrounds the peripheral wall and is generally flat and faces rearward, downward and outward in relation to the vehicle's normal forward direction of travel in order to provide the at least one of the Class II and Class IV views.

In a further embodiment of any of the above, the housing includes a base that is configured to be secured to a vehicle. An arm is configured to articulate relative to the base. The video processor is arranged in the arm, and the arm provides the exterior surface and the peripheral wall. The peripheral wall includes a terminal surface that provides an opening. The camera assembly is arranged in the opening. The lens is recessed relative to the terminal surface.

In a further embodiment of any of the above, the discontinuity is provided by a lip that is arranged circumferentially about the peripheral wall near the terminal surface.

In a further embodiment of any of the above, the lip is arranged at the terminal surface.

In a further embodiment of any of the above, the peripheral wall includes a groove. The groove is adjacent to and provides the lip.

In a further embodiment of any of the above, the peripheral wall extends along a camera centerline in a first direction. The groove has a width in the first direction. The peripheral wall has a diameter in a second direction normal to the first direction. The width is at least 3% of the diameter.

In a further embodiment of any of the above, the peripheral wall extends along a camera centerline in a first direction. The peripheral wall has a diameter in a second direction normal to the first direction. The groove has a depth in the second direction. The depth is at least 5% of the diameter.

In a further embodiment of any of the above, the lip begins within about 1 mm of the terminal surface.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
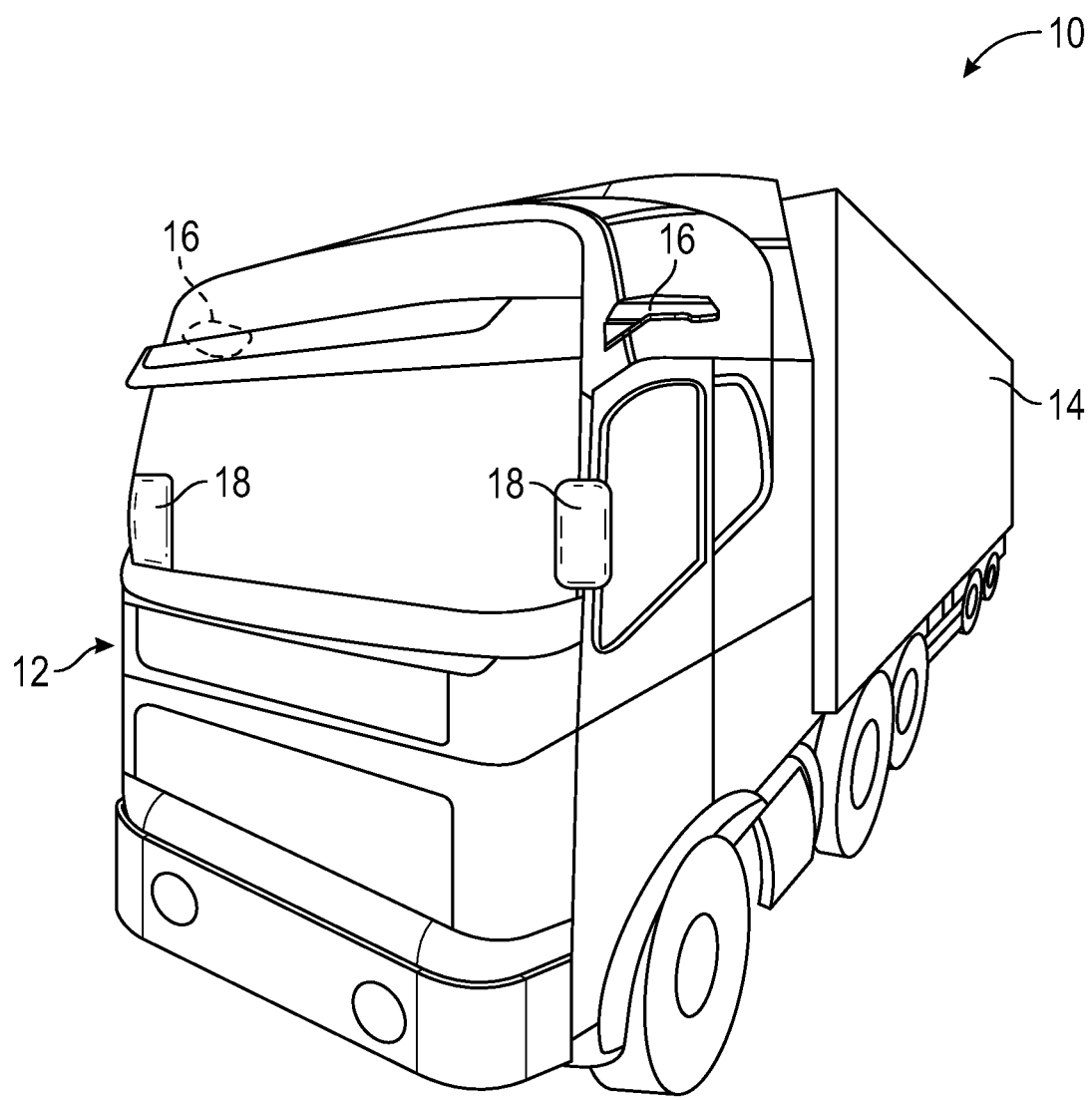
FIG. 1 is a schematic view of a commercial truck with a camera mirror system (CMS) used to provide Class II and Class IV views.

A schematic view of a commercial vehicle 10 is illustrated in FIG. 1. The vehicle 10 includes a vehicle cab 12 for towing a trailer 14. Driver and passenger side camera arms 16 are mounted to the vehicle cab 12. If desired, the camera arms 16 may include conventional mirrors integrated with them as well. First and second displays 18 (shown schematically in FIG. 1) are arranged on each of the driver and passenger sides within the vehicle cab 12 near the A-pillars to display Class II and Class IV views on each side of the vehicle 10.

A rearward facing camera 20 is arranged within each camera arm 16. The cameras 20 provide a field of view FOV1, FOV2 that includes at least one of the Class II and Class IV views. Multiple cameras also may be used on each camera arm 16, if desired. Although FIG. 1 illustrates a commercial truck, it should be understood that the disclosed housing can be used in other vehicle applications, for example, passenger cars.

Figure 2A:
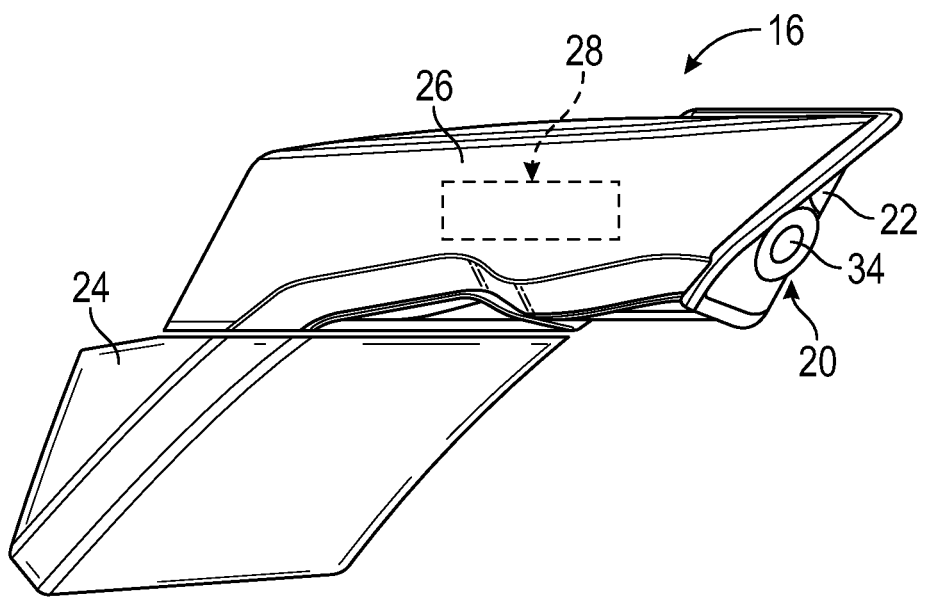
FIG. 2A is a side view of one example camera arm for a CMS.
Figure 2B:
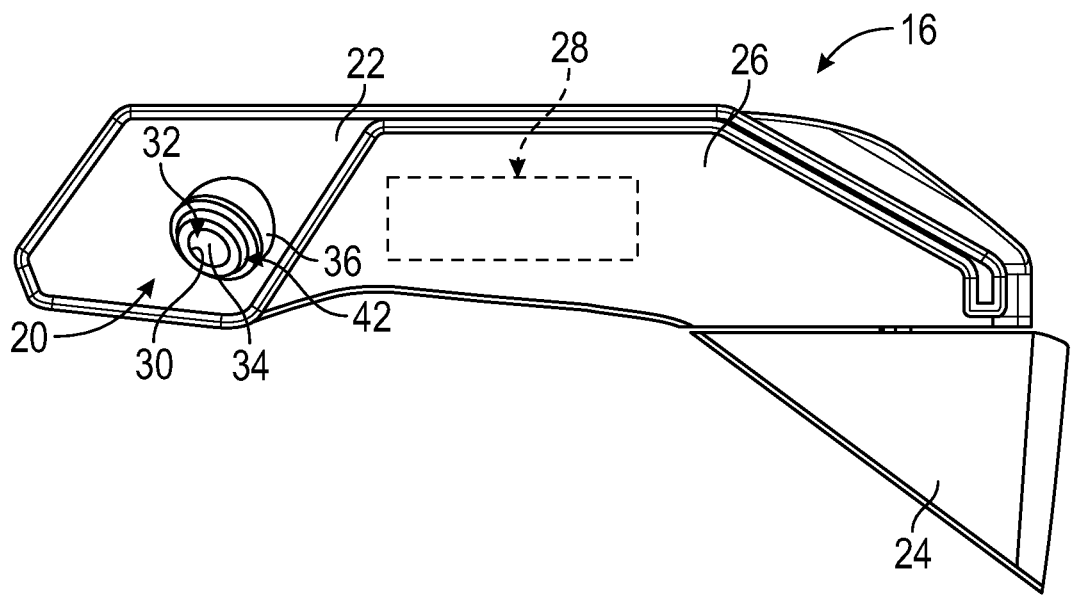
FIG. 2B is an aft view of the camera arm shown in FIG. 2A.

FIGS. 2A and 2B illustrate one example camera arm 16. The camera arm 16 includes a housing 22 having a base 24 that is secured to, for example, the cab 12. An arm 26 is supported by the base 24 and may articulate relative thereto. For example, the arm 26 may be provided by two housing structures. The first housing structure provides the base 24, and a second housing structure is provided by an outer portion of the arm 26 having the camera 20. The outer portion may rotate relative to the base 24 actively (by actuation) or passively (from contact with another object) about a generally vertical pivot axis. The housing 22, for example, may enclose electronics 28 that are configured to provide various features of the camera mirror replacement system. In one example, the electronics 28 may relate to an IR LED arrangement used to provide night vision during low light vehicle operating conditions. Video processing or other functionality may also be provided by the electronics 28. In such a configuration, a video signal is provided from the camera arm 16 to the display 18 in the cab 12.

The housing 22 includes an opening 30 that receives a camera assembly 32 having a lens 34. An image capture unit is arranged beneath the lens 32 and connected to a video processor that provides a video signal to the display 18. It is desirable to maintain the lens 34 free from debris to ensure a quality image to the display 18.

In one example configuration, the housing 22 includes an exterior surface 38, which provides the basic shape of the camera arm 26 for overall aesthetics and aerodynamic performance A peripheral wall 36, which is provided generally as at least a partial cylindrical protrusion, extends outwardly from exterior surface 38. In the example, the exterior surface 38 in the immediate area surrounding the peripheral wall 36 is generally flat and faces rearward, downward and outward in relation to the vehicle's normal forward direction of travel in order to provide the legally required views (e.g., Class II/IV views). This peripheral wall 36 circumscribes the opening 30 to provide a raised region with respect to the surrounding exterior surface 38. In the example, the length of the peripheral wall 36 is not uniform around its periphery. The peripheral wall 36 is cylindrical in shape and is truncated at the exterior surface 38 to provide an elliptical shape at their interface. Although the outer surface of the peripheral wall 36 is shown as cylindrical, the wall may have other exterior shapes. The peripheral wall 36 extends to a terminal surface 40, and the lens 34 is recessed from the terminal surface 40 to at least partially shield and protect the lens 34 from unwanted debris. In the example, the terminal surface 40 is circular in shape.

Figure 3:
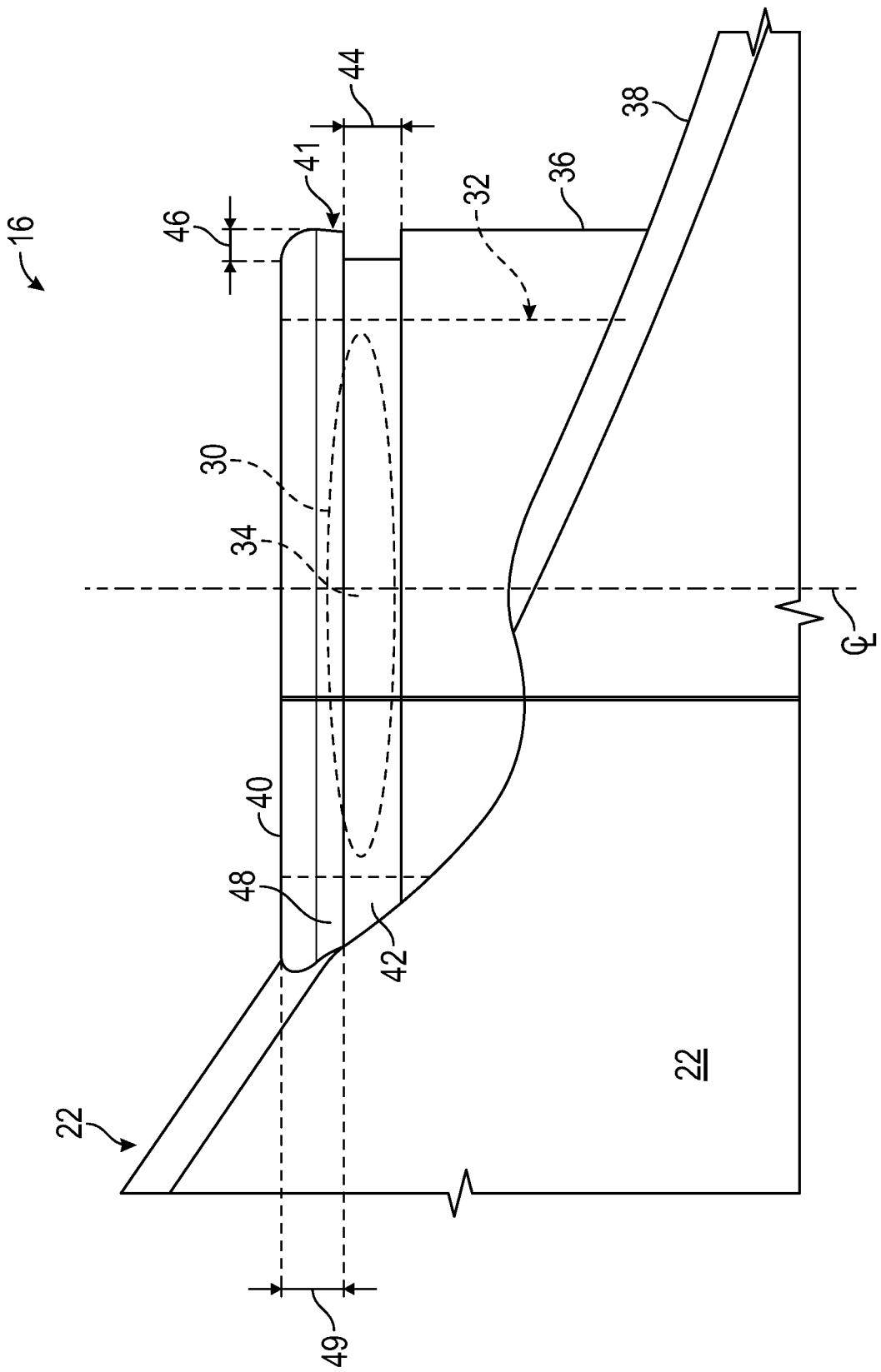
FIG. 3 is a schematic view of a portion of the camera arm with a camera assembly arranged within a housing having a discontinuity.
Figure 4A:
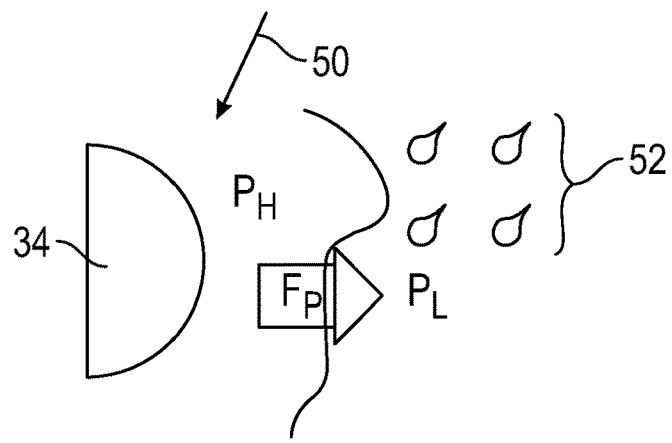
FIG. 4A schematically depicts relative pressures about a camera lens that generates a force away from the lens.
Figure 4B:
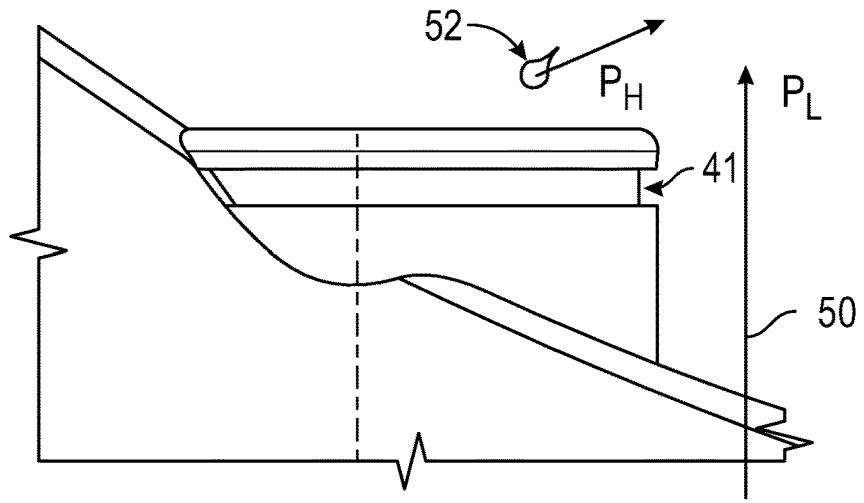
FIG. 4B illustrates the flow of debris away from the housing shown in FIG. 3 due to the relative pressures.

Referring to FIG. 3, the peripheral wall 36 includes a discontinuity 41 as configured to disrupt the flow over the peripheral wall 36 that houses the lens 34. The discontinuity 41 creates a high pressure area $P_H$ near the lens 34 relative to a low pressure area $P_L$ further away from the lens 34, which generates a force Fp that carries debris 52 away from the lens 34, as shown in FIGS. 4A and 4B.

In one example, the discontinuity 41 is provided by a lip 48 arranged near the terminal surface 40, for example, within about 1 mm of the terminal surface 40. In another example, the lip 48 may be arranged at or flush with the terminal surface 40 and includes a smooth chamfer adjoin these surfaces. In the example shown, the lip 48 is arranged around the periphery of the peripheral wall 36 and blends into the exterior surface 38, which can be seen on the left side in FIG. 3 wherein the terminal surface 40 intersects with the exterior surface 38. The lip 48 may be provided by a circumferential groove 42 having a width 44 in a first direction that corresponds to a centerline of the camera assembly 32. The groove 42 also has a depth 46 in a second direction normal to the first direction (i.e., radial relative to the centerline).

In the example, the lip 48 has the same diameter as the rest of the peripheral wall 36, excluding the groove 42, that is, the main body or portion of the peripheral wall 36 immediately adjoining the exterior surface 38. The groove 42 has sharp edges adjoining the lip 48 and the main body of the peripheral wall 36. In one example, the width 44 (extending generally in the direction of the camera centerline CL) is at least 3% of a diameter of the peripheral wall 36, and the depth 46 (extending generally transverse to the direction of the camera centerline CL) is at least 5% of the diameter. The lip 48 has a width 49 with the start of the lip (i.e., end of the groove 42) of at least 2% of the diameter, as shown in FIG. 3. As shown in FIGS. 3 and 4B, the groove 42 is arcuate in that it does not circumscribe the peripheral wall 36 and entire 360°, but the groove 42 terminates into the exterior surface 38.

Figure 5:
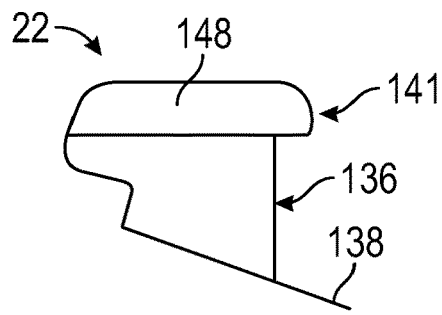
FIG. 5 is another example camera arm housing configuration with another discontinuity embodiment.

Referring to FIG. 5, which illustrates another embodiment, the groove 42 extends from the lip 148 in the direction of the camera centerline to the exterior surface 138 such that the peripheral wall 136 is circumferentially recessed with respect the circumferential perimeter of the lip 148.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A camera arm for a vehicle mirror replacement system comprising:
   a housing having an exterior surface;
   a camera assembly mounted to the housing, the camera assembly having a lens;
   a peripheral wall extending from the exterior surface and at least partially circumscribing the camera assembly; and
   a discontinuity provided on the peripheral wall, the discontinuity configured to create a high pressure region near the lens that encourages debris to migrate away from the lens in response to a fluid flow over the peripheral wall, wherein the peripheral wall includes a terminal surface providing an opening, and the camera assembly is arranged in the opening, the lens is recessed relative to the terminal surface, and wherein the discontinuity is provided by a lip arranged circumferentially about the peripheral wall near the terminal surface.

2. The camera arm of claim 1, wherein the camera is configured to provide a field of view including at least one of Class II and Class IV views to a display in communication with the camera and configured to display the field of view.

3. The camera arm of claim 1, wherein the housing includes a base configured to be secured to a vehicle, and an arm configured to articulate relative to the base, the arm provides the exterior surface and the peripheral wall.

4. The camera arm of claim 1, wherein the lip is arranged at the terminal surface.

5. The camera arm of claim 1, wherein the peripheral wall includes a groove, the groove adjacent to and providing the lip.

6. The camera arm of claim 5, wherein the peripheral wall extends along a camera centerline in a first direction, the groove has a width in the first direction, the peripheral wall has a diameter in a second direction normal to the first direction, and the width is at least 3% of the diameter.

7. The camera arm of claim 5, wherein the peripheral wall extends along a camera centerline in a first direction, the peripheral wall has a diameter in a second direction normal to the first direction, the groove has a depth in the second direction, and the depth is at least 5% of the diameter.

8. The camera arm of claim 1, wherein the lip begins within about 1 mm of the terminal surface.

9. The camera arm of claim 1, wherein the housing encloses electronics providing at least one of night vision and video processing.

10. A camera mirror system for a vehicle comprising:
    a camera having a field of view;
    a display in communication with the camera configured to depict the field of view, wherein the camera is configured to provide a field of view including at least one of Class II and Class IV views to the display in communication with the camera and configured to display the field of view;
    a housing having an exterior surface;
    a camera assembly mounted to the housing, the camera assembly having a lens;
    a peripheral wall extending from the exterior surface and at least partially circumscribing the camera assembly, wherein the exterior surface in the immediate area surrounding the peripheral wall is generally flat and faces rearward, downward and outward in relation to the vehicle's normal forward direction of travel in order to provide the at least one of the Class II and Class IV views, wherein the housing includes a base configured to be secured to a vehicle, an arm configured to articulate relative to the base, wherein the video processor is arranged in the arm, and the arm provides the exterior surface and the peripheral wall, wherein the peripheral wall includes a terminal surface providing an opening, and the camera assembly is arranged in the opening, the lens is recessed relative to the terminal surface;
    a discontinuity provided on the peripheral wall, the discontinuity configured to create a high pressure region near the lens that encourages debris to migrate away from the lens in response to a fluid flow over the peripheral wall, wherein the discontinuity is provided by a lip arranged circumferentially about the peripheral wall near the terminal surface; and
    a controller includes a video processor that is configured to provide a video signal to the display.

11. The system of claim 10, wherein the lip is arranged at the terminal surface.

12. The system of claim 10, wherein the peripheral wall includes a groove, the groove adjacent to and providing the lip.

13. The system of claim 12, wherein the peripheral wall extends along a camera centerline in a first direction, the groove has a width in the first direction, the peripheral wall has a diameter in a second direction normal to the first direction, and the width is at least 3% of the diameter.

14. The system of claim 12, wherein the peripheral wall extends along a camera centerline in a first direction, the peripheral wall has a diameter in a second direction normal to the first direction, the groove has a depth in the second direction, and the depth is at least 5% of the diameter.

15. The system of claim 10, wherein the lip begins within about 1 mm of the terminal surface.

* * * * *